United States Patent [19]

Inoue

[11] 4,379,959
[45] Apr. 12, 1983

[54] METHOD OF AND APPARATUS FOR WIRE-CUTTING A WORKPIECE BY ELECTROEROSION

[75] Inventor: Kiyoshi Inoue, Tokyo, Japan

[73] Assignee: Inoue-Japax Research Incorporated, Yokohama, Japan

[21] Appl. No.: 193,668

[22] Filed: Oct. 3, 1980

[30] Foreign Application Priority Data

Oct. 4, 1979 [JP] Japan .................. 54-128621
Nov. 21, 1979 [JP] Japan .................. 54-151274

[51] Int. Cl.³ .................................. B23P 1/12
[52] U.S. Cl. ...................... 219/69 M; 219/69 W
[58] Field of Search .................. 219/69 W, 69 M

[56] References Cited

U.S. PATENT DOCUMENTS 3,891,819 6/1975 Ullmann et al. .............. 219/69 W
3,912,899 10/1975 Lehmann et al. ............. 219/69 W

FOREIGN PATENT DOCUMENTS 1484728 9/1977 United Kingdom.
2010161 6/1979 United Kingdom.
2052340 5/1980 United Kingdom.
2066717 11/1980 United Kingdom.
524658 10/1976 U.S.S.R. ..................... 219/69 W

*Primary Examiner*—C. C. Shaw
*Attorney, Agent, or Firm*—Karl F. Ross; Herbert Dubno

[57] ABSTRACT

An improved method of and arrangement for threading a wire electrode through a workpiece in a wire-cutting electroerosion machine having a continuous wire electrode axially transported from a supply means to a collection means along a predetermined wire guiding path; a pair of machining guide members disposed at opposite sides of the workpiece in the path for spanning the axially running wire electrode straightforwards thereacross through the workpiece and cutting feed means for displacing the workpiece relative to the axially running wire electrode transversely to the axis thereof along a prescribed feed path to form a desired electroerosion cut in the workpiece. The method comprises: forming a straight through-hole in the workpiece at a preselected location thereof representing a start point of the said prescribed feed path; positioning a wire electrode having a straightened broken end continuous from the supply means through the first of the said machining guide members disposed at an inlet side of the workpiece to locate the said broken end ahead of the workpiece; positioning the workpiece to locate the axis of the through-hole in coincidence with the axis of the straightened broken end projecting from the first machining guide member; and advancing the wire electrode with the straightened broken end into and through the through-hole of the workpiece and through the second of the said machining guide members disposed at an outlet side of the workpiece.

17 Claims, 20 Drawing Figures

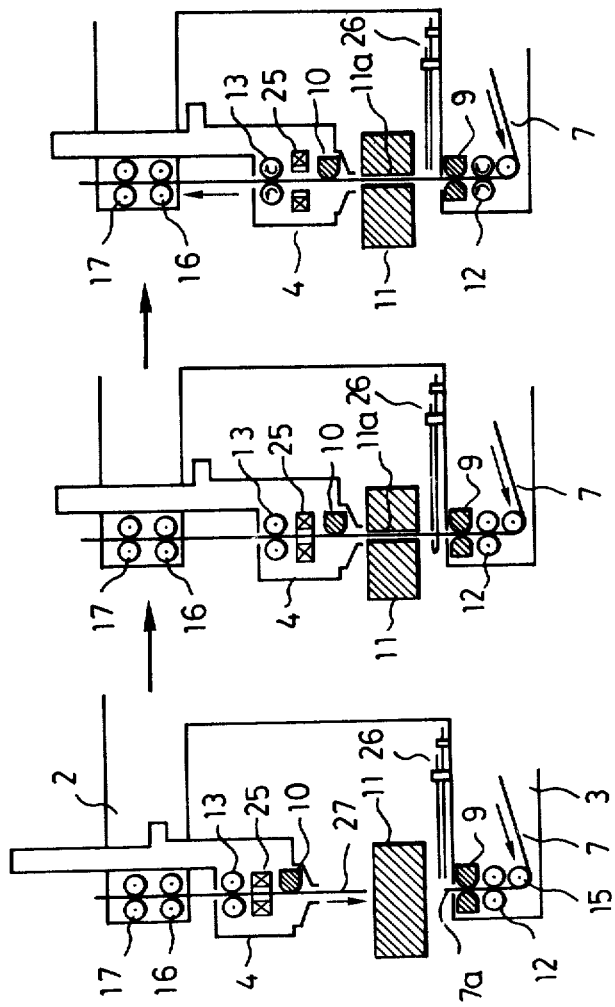

FIG. 8A  FIG. 8B  FIG. 8C
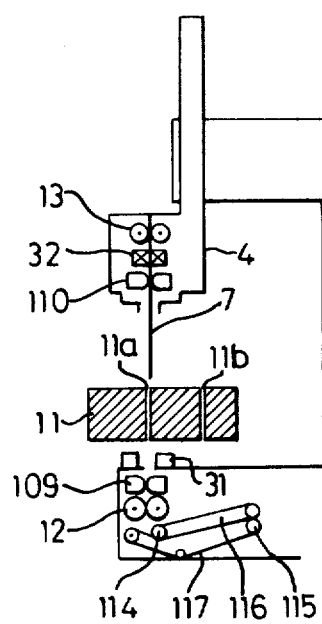
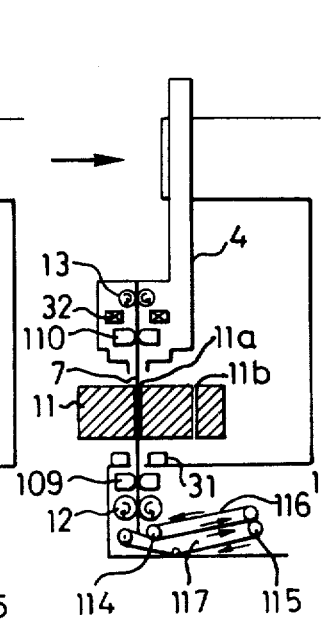
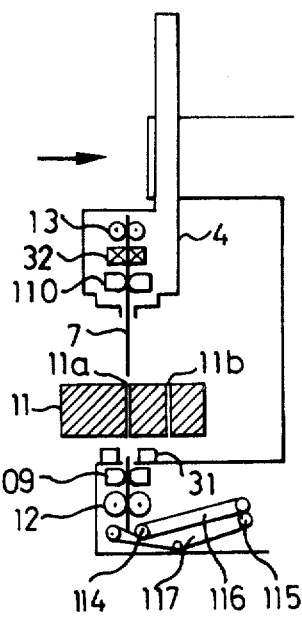
FIG. 8E  FIG. 8D
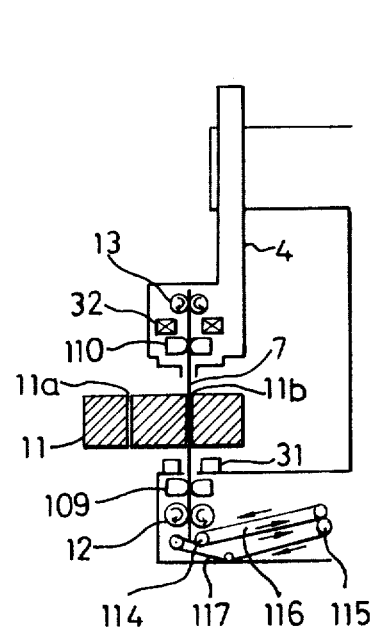
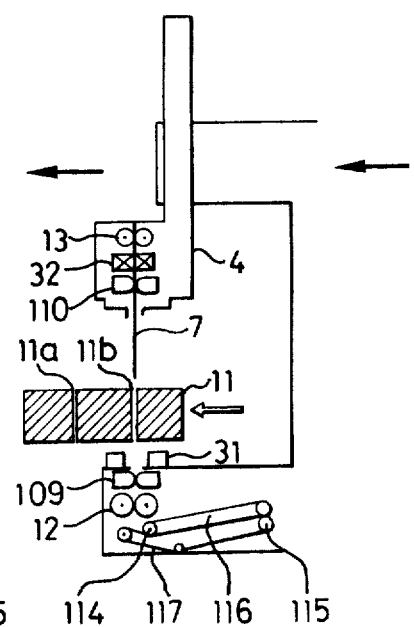

METHOD OF AND APPARATUS FOR WIRE-CUTTING A WORKPIECE BY ELECTROEROSION

FIELD OF THE INVENTION

The present invention relates generally to wire-cutting electroerosion processes and, more specifically, to a method of and apparatus for wire-cutting a workpiece by electroerosion. The term "electroerosion" as used herein is intended to include electrical discharge machining (EDM), electrochemical machining (ECM) and electrochemical-discharge machining (ECDM). The invention particularly concerns a method of and arrangement for threading or passing a continuous wire electrode through a workpiece.

BACKGROUND OF THE INVENTION

In the method of wire-cutting a workpiece by electroeroerosion, a continuous wire electrode is axially transported from a supply means to a collection means. In the path of wire travel, a pair of machining guide members are commonly disposed at opposite sides respectively of the workpiece to stretch the traveling wire electrode linearly thereacross, thus traversing the workpiece and, positioning the traveling wire electrode in a machining relationship with the workpiece. The apparatus includes a power supply for passing an electrical machining current, typically in the form of a succession of pulses, between the wire electrode and the workpiece across a machining gap flooded with a machining liquid, e.g. water, to electoerosively remove material from the workpiece. As the material removal proceeds, the workpiece is displaced transversely relative to the axis of the wire electrode along a prescribed feed path so that a desired cut is formed in the workpiece. The operation commonly requires, in advance, threading or passing the continuous wire electrode through the unmachined workpiece.

OBJECT OF THE INVENTION

An object of the present invention is to provide an improved method of wire-cutting the workpiece by electeroerosion in which threading or passing a wire electrode through the workpiece is achieved easily and efficiently.

Another object of the invention is to provide a wire-cutting electroerosion method which is capable of easily and efficiently threading or passing the wire electrode through a workpiece whereby the operating efficiency of a given wire-cutting process is markedly improved.

A further object of the invention is to provide an improved method of operating a wire-cutting electroerosion machine in which threading or passing the wire electrode through a workpiece is achieved substantially automatically.

A still further object of the invention is to provide an apparatus for wire-cutting a workpiece by electroerosion in which threading or passing a wire electrode through the workpiece is achieved easily and efficiently.

Yet another object of the invention is to provide a wire-cutting electroerosion apparatus which is capable of easily and efficiently threading or passing a wire electrode through a workpiece whereby the efficiency of a given wire-cutting operation is markedly improved.

Still another object of the invention is to provide an improved wire-cutting electroerosion machine for automatically threading a wire electrode through a workpiece.

SUMMARY OF THE INVENTION

These and other objects of the present invention are attained, in accordance with a first aspect thereof, by providing an improvement in the method of wire-cutting a workpiece by electroerosion wherein a continuous wire electrode is axially transported from a supply means to a collection means along a predetermined wire guiding path to traverse the workpiece linearly between a pair of machining guide members disposed at opposite sides of the workpiece in the path and adapted to position the wire electrode therebetween in a machining relationship with the workpiece; and an electrical machining current is passed between the wire electrode and the workpiece across a machining gap flooded with a machining medium to electroerosively remove material from the workpiece while the workpiece is displaced transversely and relative to the wire electrode along a prescribed feed path to form a desired cut in the workpiece, which improvement comprises the steps of: (a) forming a straight through-hole in the workpiece at a preselected location thereof representing a start point of the said prescribed feed path; (b) positioning a wire electrode having a straightened broken, free end portion and extending continuously from the supply means through the first of the said machining guide members disposed at an inlet side of the workpiece to locate said free end portion ahead of said workpiece; (c) positioning the workpiece to locate the axis of the through-hole coaxially with the axis of the straightened broken, free end portion projecting from the first machining guide member; (d) advancing the said wire electrode with the straightened broken end into and through the said through-hole in the workpiece and through the second of the said machining guide members disposed at an outlet side of the workpiece; and subsequently, (e) proceeding to the wire-cutting of the said workpiece by electroerosion.

Advantageously, the improvement further includes the steps of: subsequent to step (a), inserting through the said through-hole a slender guide element which is straight at least along the length of the through-hole; connecting the end of the said slender guide element projecting from the through-hole at the inlet side with the said free end portion of the wire electrode; and withdrawing the said slender guide element from the said throughhole to the said outlet side and continuingly displacing it through the said second machining guide member towards the said collection means to effect step (d).

The slender guide element may be a detached wire element anchored or securely held in the said through-hole against dropping out. A plurality of such through-holes may be formed in the workpiece at such preselected locations to form the corresponding number of desired cuts therein. Such detached wire elements are then inserted through the respective through-holes and are held therein against dropping out and thereafter steps (b), (c), (f), (d) and (e) are carried out in sequence starting at each of the through-holes in turn.

The or each through-hole may be formed in the workpiece by juxtaposing a slender tool electrode constituting the slender guide element with the workpiece at the said outlet side and electroerosively machining the through-hole in the workpiece with the slender tool electrode. Advantageously, a sonic or ultrasonic vibration, say of a frequency of 1 to 50 kHz and with an amplitude of 1 to 10 microns, is imparted to the slender tool electrode to facilitate the electroerosive machining of the through-hole in the workpiece.

The slender tool element may be a wire electrode having a broken, free end portion extending continuously to the collection means and constituting the counterpart of the first-mentioned wire electrode having the said broken, free end portion to form the said continuous wire electrode.

The end of the slender guide element projecting from the through-hole is advantageously connected with the said free end portion of the wire electrode at the said inlet side by fusion-joining them together.

In step (b) the said broken, free end portion may be formed and located ahead of the workpiece by cutting the continuous wire electrode at a first region between the first machining guide member and the workpiece to divide it into a first portion thereof continuous from the supply means and a second portion thereof continuous to the collection means. Alternatively, the said broken, free end portion of wire electrode is formed by cutting the continuous wire electrode at a second region between the workpiece and the second machining guide member to divide it into a first portion thereof continuous from the supply means and constituting the said wire electrode with the broken, free end portion and a second portion thereof continuous to the collection means, the said broken, free end portion being located in step (b) by retracting the said first portion to pass the broken, free end portion through the through-hole and to withdraw it out of the latter into the said inlet side.

Advantageously, the said continuous wire electrode is cut while applying a heat thereto at least in the said first or second region. The heat is preferably applied to the wire electrode to produce a predetermined temperature gradient at least through the said region.

According to a second aspect of the present invention there is provided an apparatus in combination with a wire-cutting electroerosion machine having a continuous wire electrode axially transported from a supply means to collection means along a predetermined wire guiding path; a pair of machining guide members disposed at opposite sides of the workpiece in the path for stretching the axially running wire electrode linearly thereacross through the workpiece and positioning it in a machining relationship with the workpiece; power supply means for passing an electrical machining current between the wire electrode and the workpiece across a machining gap flooded with a machining medium to electroerosively remove material from the workpiece; and cutting feed means for displacing the workpiece transversely and relative to the axially running wire electrode along a prescribed feed path to form a desired electroerosion cut in the workpiece, which apparatus comprises: (a) means for forming a straight through-hole in the workpiece at a preselected location thereof representing a start point of the prescribed feed path; (b) means for positioning a wire electrode having a straightened broken, free end portion extending continuously from the supply means through the first of the machining guide members disposed at an inlet side of the workpiece to locate the said broken, free end portion ahead of the workpiece; (c) means for positioning the workpiece to locate the through-hole coaxially with the said straightened broken, free and portion projecting from the said first machining guide member; and (d) means for advancing the said wire electrode with the straightened, broken, free end portion into and through the through-hole in the workpiece and through the second of the machining guide members disposed at an outlet side of the workpiece.

The apparatus should preferably make use of a slender guide element for insertion through the said through-hole; means for connecting the end of the slender guide element projecting from the through-hole at the said inlet side with the said broken, free end portion of the wire electrode; and means for withdrawing the slender guide element from the through-hole to the said outlet side and continuously displacing it through the said second machining guide member towards the said collection means.

The slender guide element may be a detached wire element anchored or held securely in the said through-hole against dropping.

Means (a) may comprise a slender tool electrode, a power supply which may make use of the said power supply means for passing an electrical machining current between the said tool electrode and the workpiece and a feed unit for advancing the tool electrode into and through the workpiece to electroerosively machine the said through-hole therein. Means (a) according to this specific feature should preferably include means for imparting a sonic or an ultrasonic vibration to the slender tool electrode.

The same means for connecting the end of the said slender guide element with the said broken, free end portion of the wire electrode may comprise a fusion welding unit having a pair of electrodes adapted for engagement with the two ends when brought together.

Advantageously, means is provided for cutting the contnuous wire electrode in a region of the workpiece between the first and second machining guide members to form the wire electrode with the said broken, free end portion. The cutting means preferably comprises a heater for applying heat to the wire electrode in the said region and tension means for applying a tension to the wire electrode so that the wire electrode is thermally elongated and broken straightaway. The heater is preferably adapted to apply a predetermined temperature gradient in the wire electrode in the said region.

BRIEF DESCRIPTION OF DRAWING

These and other objects, features and advantages of the present invention will become more readily apparent from a reading of the following description of certain embodiments thereof taken with reference to the accompanying drawing in which:

FIGS. 2A, 2B and 2C are schematic views diagrammatically illustrating one embodiment of the method of the present invention using the arrangement of FIG. 1;

FIGS. 8A, 8B, 8C, 8D and 8E are schematic views diagrammatically illustrating a further embodiment of the method of the present invention with the arrangement of FIG. 4.

Figure 1:
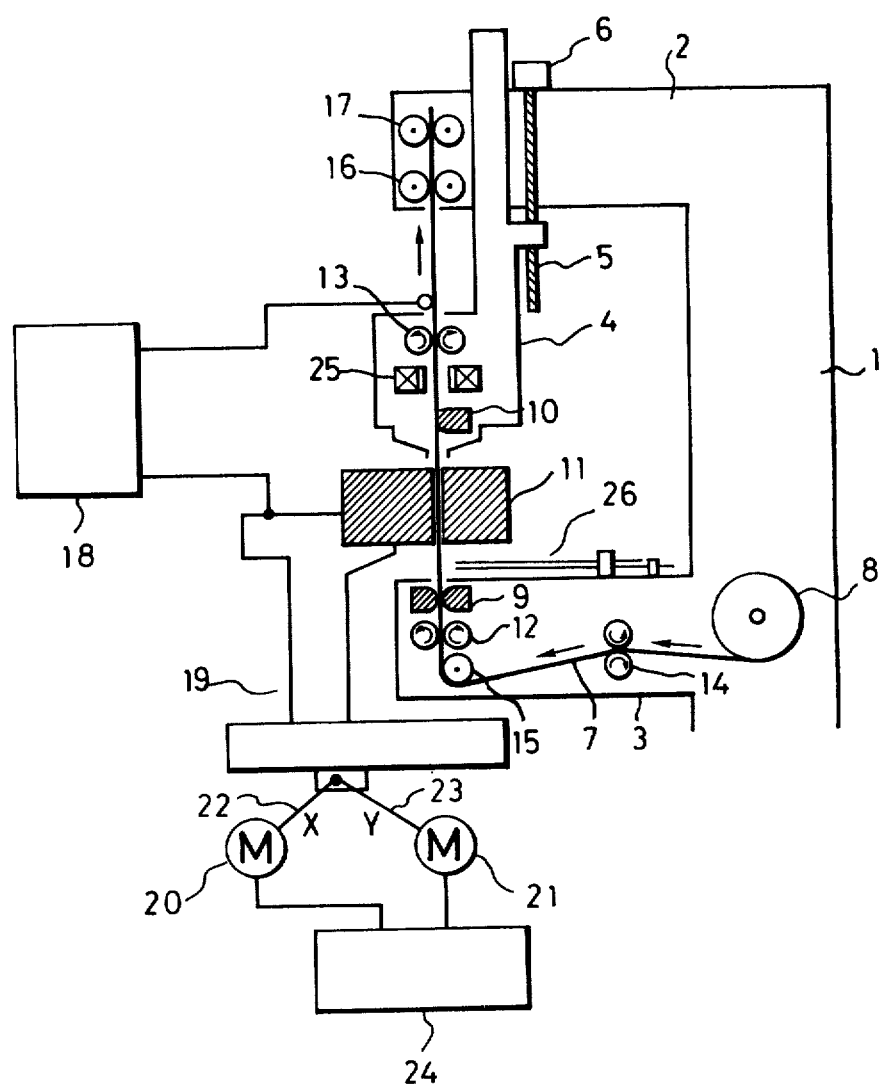
FIG. 1 is a schematic view diagrammatically illustrating a wire-cutting electroerosion machine or apparatus incorporating the present invention.

Referring first to FIG. 1 a wire-cutting electroerosion machine is shown comprising a vertical column 1, an upper arm 2 and a lower arm 3 both of which extend horizontally from the column 1 and a machining head 4 which depends, vertically movable, from the upper arm 2. The head 4 is carried on a lead screw 5 secured to the upper arm 2 and is driven by a motor 6 to adjust the vertical position of the head 4. A thin wire electrode 7 which is of a diameter, say, of 0.05 to 5 mm is stored in a supply reel 8 shown mounted on the column 1 and is continuously drawn out into a cutting zone defined between a guide member 9 secured to the lower arm 3 and an upper guide member 10 secured to the machining head 4. A workpiece 11 is disposed in the cutting zone. The wire electrode is continuously drawn out from the supply reel 8 by the action of a capstan and pinch-roller arrangement 12 drivingly mounted on the lower arm 3 and is axially driven through the cutting zone while transversing the workpiece 11 by the action of another capstan and pinch-roller arrangement 13 drivingly mounted on the machining head 4, which serves to direct the wire electrode 7 from the cutting zone to a takeup side. In the supply side, brake rollers 14 are drivingly mounted on the lower arm 3 to apply a suitable tension to the wire electrode being driven and a guide roller 15 is also arranged to change the direction of advance of the wire electrode 7. In the takeup side there are arranged guide rollers 16 and 17 on the upper arm 2 to guide the wire electrode 7 into or onto collection means such as a takeup reel not shown.

The guide members 9 and 10 serve to position the axis of the wire electrode 7 traveling stretched therebetween precisely in a machining relationship with the workpiece 11 securely mounted upon a workpiece support or worktable 19. An electroerosion power supply 18 is connected on one hand to the wire electrode 7 via a brush and on the other hand to the workpiece 11 via the workpiece support 19 to supply a machining current, typically in the form of a succession of electrical pulses, between the traveling wire electrode 7 and the workpiece through a machining gap therebetween flooded with a machining medium, typically water, which may be supplied by one or more nozzles not shown to electroerosively remove material from the workpiece 11.

During the course of machining operation, the worktable 19 is driven in a plane, shown by an X-Y plane, by means of an X-axis motor 20 and a Y-axis motor 21 drivingly coupled via lead screws 22 and 23, respectively, to the worktable 19. The motor 20 and 21 are energized with X-axis and Y-axis drive signals furnished from a numerical-control (NC) unit 24 to displace the workpiece 11 relative to the axis of the traveling wire electrode 7 in a prescribed cutting path preprogrammed in the NC unit 24.

The apparatus of FIG. 1 is further provided with a vibrating head 25 and a fusion or welding assembly 26 both of which are inoperative during a wire-cutting electroerosion operation and may be used in conjunction with the practice of a method according to the present invention as will be described with reference to FIGS. 2A, 2B and 2C. The head 25 is attached to the machining head 4 while the fusion or welding assembly 26 is shown disposed on the lower arm 3 to act on the wire electrode 7 prior to entry into the workpiece 11.

With reference to FIGS. 2A, 2B and 2C in which, as well as in all subsequent FIGURES, the same reference numerals as are shown in FIG. 1 are used to designate the same components or parts of the apparatus, the method is carried out in three steps.

The first step shown in FIG. 2A is designed to form a base hole shown at 11a in FIGS. 2B and 2C, the hole being for the purpose of receiving the wire electrode 7 for a wire-cutting electroerosion operation. To this end, the wire electrode 7 supplied from the source reel (8 in FIG. 1) is shown with a broken, free-end portion 7a, and is driven by means of the capstan and pinch-roller drive unit 12 to position the free end 7a, just above the lower guide member 9 and below the lower surface of the workpiece 11 while a drilling electrode 27 in the form of a wire or a slender rod is mounted on the machining head 4. The drilling electrode 27 is supplied through the guide rollers 16 and 17 and axially driven downwardly while in contact with the machining positioning guide member 10 by means of the capstan and pinch-roller drive unit 13 until it is juxtaposed with the upper surface of the workpiece 11. The worktable 19 (FIG. 1) is displaced by means of the motors 20 and 21 (FIG. 1) under the instructions of the NC unit 24 (FIG. 1) to precisely fix the position of a desired base hole 11a (FIGS. 2B and 2C) immediately below and coaxial with the drilling electrode 27. The vibration head assembly 25 is brought into engagement with the drilling electrode 27 to impart a sonic or ultrasonic vibration to the electrode 27 longitudinally of or transversely to the axis thereof. Under this state, a machining current is passed from the power supply 18 between the drilling electrode 27 and the workpiece 11 in the presence of the machining liquid and the motor 6 (FIG. 1) is driven to downwardly move the machining head 4 thereby causing the drilling electrode to penetrate into the workpiece 11 at the rate of electroerosive material removal from the latter as that the hole 11a is completely formed through or across the thickness of, the workpiece 11. By virtue of the action of a sonic or ultrasonic vibration imparted to the electrode, the desired hole drilling is achieved with stability and in an extremely short period of time. The machining head 4 continues to be advanced until the lower end of the drilling electrode 27 passing through the hole 11a thus formed in the workpiece 11 comes in contact with the free end 7a of the wire electrode 7 projecting above the guide member 9 as shown in FIG. 2B, Upon completion of the hole forming operation, the vibration head assembly 25 is disengaged from the drilling electrode 27.

In the second step, the contacting free ends of the drilling electrode 27 and the wire electrode 7 are joined together. Thus, in FIG. 2B the welding assembly 26 is actuated to bring a pair of electrodes into engagement with these contacting ends and to permit a welding current to be applied thereby to join them together. The workpiece 11 is held stationary in position.

In the third step shown in FIG. 2C, the workpiece 11 continues to be held stationary in position while the welding assembly 26 is retracted and removed from the wire electrode 7 joined with the drilling electrode 27 and the drive units 12 and 13 are actuated to draw the joined wire electrodes 27 and 7 upwardly through the hole 11a, thereby completing the mounting or threading of the wire electrode 7 through the base hole 11a. The drilling electrode 27 guided out from the rollers 17 may be cut and the wire electrode 7 led to the collection site to establish a setting condition preparatory to a given wire-cutting operation as described in connection with FIG. 1.

The fusion assembly 26 can also be used to divide (i.e. break) the continuous wire electrode 7 stretched between the guide members 9 and 10 across the wire-cut workpiece 11 into a lower part leading from the supply side 8 and an upper part leading to the collection side. By bringing the electrodes of the welding assembly 26 into engagement with a portion of the stretched wire 7 between the lower guide member 9 and the lower surface of the workpiece 11 and energizing the electrodes with the fusion current, the division can be achieved. When a subsequent wire-cutting operation is to follow, the lower part of wire electrode may remain in its position while the upper part of wire electrode is retracted to locate its end above the upper surface of the workpiece 11. The wire-cut workpiece may then be replaced by a subsequent workpiece or, when a plurality of areas of the workpiece are to be wire-cut, it may simply be displaced to present a new area to a subsequent wire-cutting operation. The worktable 19 is then driven under programmed instructions of the NC unit 24 to position a now base hole to be formed in the replaced workpiece or replaced area of workpiece, relative to the coaxial axes of the divided upper and lower parts of the wire electrode 7. The upper portion of wire electrode 7 may then be replaced by a drilling electrode. Then the hole-forming and wire-mounting operations in sequence as have been described may follow.

It is advantageous to use the retracted upper portion of wire electrode 27 as the drilling electrode. This is particularly convenient when the wire electrode 7 is relatively thick. Neither a separate drilling electrode nor a separate setting operation is then required.

It will be appreciated that the wire threading process described can be achieved on a fully automatic basis simply with the aid of the machining NC unit 24 and thus enables an extremely efficient wire-cutting operation.

FIGS. 3A-3E illustrate another embodiment of the invention in which a workpiece 11 is formed in advance with one or more base holes 11a, 11b, ... at a preselected location or locations therein and has a guide in the form of a wire or slender rod 28a, 28b ... threaded through each hole 11a, 11b, ... and held there against dropping out. The wire threading through each hole is achieved by connecting the lower part of wire electrode 7 with the guide 28a, 28b .... In the apparatus shown, the machining head 4 is provided with an upward roller unit 29 by means of which the guide 28a, 28b, ... is caught at its upper end. The formation of each hole 11a, 11b, ... may be done by any conventional drilling process, e.g. EDM, ECM, ECDM, mechanical machining or with a laser or electron beam. It is typical to mount on the machine the workpiece after formation of the hole or holes 11a, 11b, ... and having the guide or guides 28a, 28b, ... therein. To hold the guide 28a, 28b, ... against droping out, the top portion thereof may slightly be bent so that it hangs on the hole 11a, 11b, ....

Figures 3A, 3B, 3C:
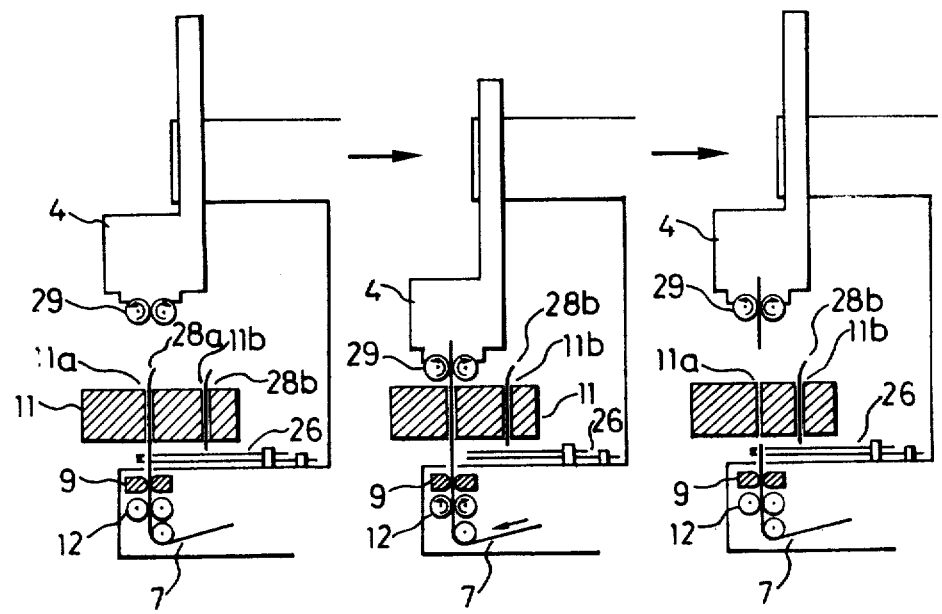
FIGS. 3A, 3B, 3C, 3D and 3E are shematic views diagrammatically illustrating another embodiment of the method of the present invention.

FIG. 3A shows the first step in which by positioning the workpiece 11, the lower end portion of the guide 28a which passes through the hole 11a comes to meet with the end portion of the wire electrode 7 projecting from the lower wire guide member 9. The portions in mutual contact are held between the electrodes of the fusion assembly and, energized with a fusion current, are welded together.

In the second step, as shown in FIG. 3B, the fusion assembly 26 is retracted and the machining head 4 is moved down to bring the top portion of the guide 28a into engagement with the roll-in roller unit 29. The unit is driven to catch the guide 28a between the rollers 29 and to continuously draw it upwards to allow the wire electrode 7 to pass through the hole 11a and the rollers 29. The rollers 29 are made of material having a large friction, such as rubber, and are thus capable of drawing the guide and the wire electrode in with ease.

A wire-cutting operation is conducted with the wire electrode 7 so drawn through the hole 11a. The capstan and pinch-roller units 12 and 13 are driven to continuously effect the take-up action of the wire electrode 7 from the supply reel 8 through the cutting zone (FIG. 1).

The desired contour having been formed in the workpiece 11 starting at the base hole 11a, the cutting feed of the workpiece 11 is halted and the displacement of the wire electrode 7 by the capstan and pinch-roller 12 is brought to a stop. Then the continuous wire electrode 7 stretched between the supply and takeup sides is cut below the workpiece 11 by the fusion assembly 26 and the machining head 4 is retracted to draw the upper portion of wire electrode 7 out from the workpiece 11 as shown in FIG. 3C for removal.

Figures 3D, 3E:
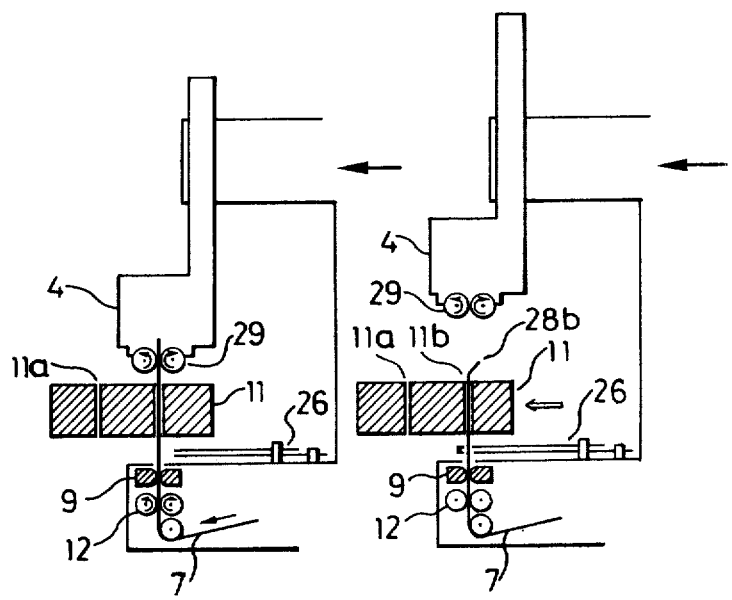

The next step may, as shown in FIG. 3D. displace the workpiece 11 to a next cutting start position under instructions from the NC unit 24 to bring the hole 11b in alignment with the axis of the wire electrode 7 projecting from the guide member 9. The fusion assembly 26 is again actuated to weld together the lower end of the guide wire 28b previously passed through the hole 11b and the upper end portion of the lower part of wire electrode 7. The fusion-joining of the guide wire 28b with the wire electrode 7 is followed by the step of FIG. 3E to pass the wire electrode 7 through the hole 11b, thus bringing it ready for the subsequent wire-cutting operation starting at the hole 11b. In this manner, a number of preselected areas in a workpiece are machined in sequence starting successively at preformed holes 28a, 28b, .... The threading of the wire electrode 7 through each starting hole in each stage is extremely accurate and yet simple and will be apparent from the foregoing and permits each individual and sequential wire-cutting operation to be performed with a markedly improved efficiency.

It will be appreciated that any means other than fusion welding, such as soldering, adhesive-bonding or manual knotting, may be used to join the wire-like guide 28a, 28b with the wire electrode 7. Further, the guide 28a, 28b may be held against dropping out by any known means. For example, when the workpiece 11 is a magnetically susceptible material, the wirelike guide 28a, 28b may be composed of a magnetized material and may be held in the hole 11a, 11b in position by magnetic attraction to the workpiece. The guide 28a, 28b may also be held by electrostatic attraction. The guide 28a, 28b may also have a fishhook-like end and may thereby be suspended. The continuous wire electrode may be divided into upper and lower portions by cutting with a knife.

Figure 4:
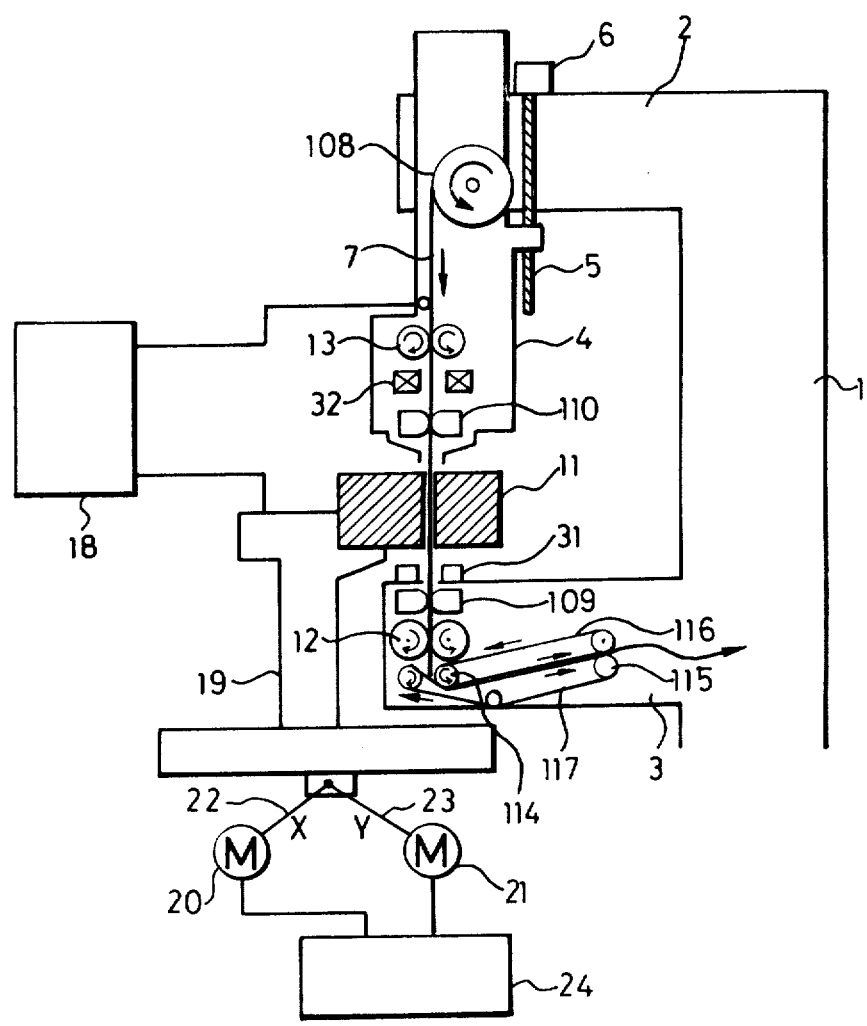
FIG. 4 is a schematic view diagrammatically illustrating a modified form of the wire-cutting electroerosion machine or apparatus according to the present invention.

In FIG. 4 there is shown a modified wire-cutting machine or apparatus for the explanation of a further embodiment of the invention. In this machine, a supply reel 108 for the wire electrode 7 is mounted on the machining head 4, the capstan and pinch-roller unit 13 mounted on the machining head 4 is used for drawing the wire electrode 7 from the supply reel 108 and the capstan and pinch-roller unit 12 mounted on the lower arm 3 is used to draw the wire electrode 7 traveling between a wire-guide member 110 at the inlet side and a wire-guide member 109 at the outlet side across the region of the workpiece 11 in the direction of arrow. Downstream of the traction capstan and pinch-roller unit 12, there are provided a pair of guide roller units 114 and 115 around which two endless belts 116 and 117 pass in mutual engagement so that the wire electrode 7 fed out from the unit 12 is drawn in between the belts 116 and 117 passing in engagement therewith, and is fed to collection means not shown.

Figure 6B:
FIGS. 6A and 6B are enlarged views schematically illustrating a wire electrode elongated under heat and tension and eventually broken, respectively, in the operation of the arrangement of FIG. 4.
Figure 6A:
Figure 5:
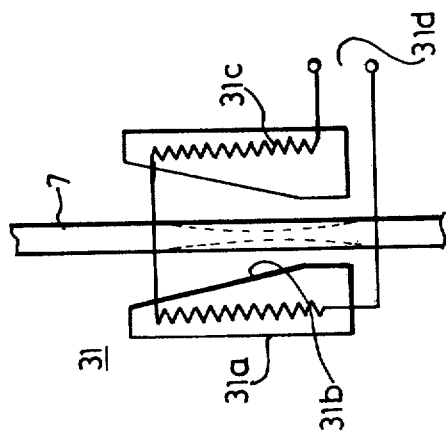
FIG. 5 is an enlarged schematic view diagrammatically illustrating a heater assembly in the arrangement of FIG. 4.

Beneath the workpiece 11 or outlet side of the cutting region there is provided a heater unit 31 on the lower arm 3 in this embodiment to apply heat to the wire electrode 7 coming out from the workpiece 11. A preferred example of this unit may, as diagrammatically shown in FIG. 5, have a body 31a with a trapezoidal or frustoconical inner heating surface 31b tapered convergently in the direction of displacement of the wire electrode 7 and with a heating coil 31c embedded therein and energized by a power supply 31d. Because the heating surface 31b is so tapered, a temperature gradient develops in the heated wire electrode 7 as diagrammatically shown by broken lines in FIG. 5. The wire electrode 7 in the machining head 4 is held by a magnetic grip 32 and the machining head 4 is moved upwardly to apply a tension to the wire electrode. The wire electrode heated in the heater unit 31 is then drawn and elongated with a taper as shown in FIG. 6A and is eventually broken as shown in FIG. 6B. In this manner, any deflection in the heated wire electrode 7 is eliminated and a sharp, straight needle-like tip is formed in the broken wire electrode 7 as shown in FIG. 6B. For example, a cooper wire electrode has a tensile strength of 45 kg/mm$^2$ at a room temperature. When heated to 150 to 230° C., the wire electrode has the tensile strength reduced to about 15 kg/mm$^2$. When loaded with a suitable tension, the wire of 1 m long is capable of being elongated to a length of 3.5 m. The thermally controlled elongation eliminates any deflection which the wire 7 has and makes it linearly straightened. The wire electrode 7 is broken at the most heated portion and, since the broken wire electrode is sharply pointed as shown in FIG. 6B, it can quite easily be passed into a base hole 11a formed in the workpiece 11.

Figure 7:
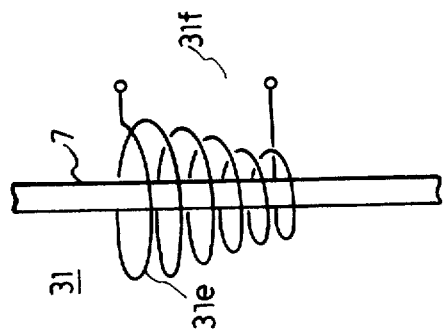
FIG. 7 is an enlarged schematic view diagrammatically illustrating a modified heater assembly.

FIG. 7 shows another embodiment of the heater unit 31. This embodiment makes use of a coil 31c wound tapering convergently in the direction of travel of the wire 7 and energized with a heating current furnished by a power supply 31f. The heater may be disposed at the inlet side of or above the workpiece 11.

With reference to FIGS. 8A, 8B, 8C, 8D and 8E, a wire threading or mounting operation with the apparatus of FIG. 4 will be described.

FIG. 8A shows a first step in which the wire electrode 7 is broken and the machining head 4 is retracted. The workpiece 11 has been formed in advance with base holes 11a and 11b by mechanical drilling, EDM, ECM etc. The hole 11a has been positioned properly under control of the NC unit 24 as described previously.

In the second step shown in FIG. 8B, the machining head 4 is moved down to insert the lower end of the broken wire 7 into the hole 11a and the electromagnetic grip 32 is deactuated to release the wire 7. Then the capstan and pinch-roller drive units 12 and 13 and the belt drive units 114, 116; 115, 117 are actuated to cause the inserted wire electrode 7 to be further driven and its lower end to pass through the hole 11a, the lower wire guide member 109 and the capstan and pinch rollers 12 and to be rolled between the take-up belts 116 and 117. The belts 116 and 117 are made of a material having a large friction, such as rubber, and are thus capable of drawing the wire electrode in with ease. The mounting or threading of the wire electrode 7 through the base hole 11a has been completed.

A wire-cutting operation is conducted with the wire electrode 7 so threaded through the hole 11a. The capstan and pinch-roller units 12 and 13 and the belt assembly 114 to 117 continue to be driven to continuously effect the take-up action of the wire electrode 7 from the supply reel 108 (FIG. 4) through the cutting region.

The desired contour having been formed in the workpiece 11 starting at the base hole 11a under controlled drive signals for the motors 20 and 21 furnished from the NC unit 24, the displacement of the workpiece 11 comes to stop and the capstan and pinch-roller units 12 and 13 and the belt assembly 114 to 117 also deactuate to bring the wire electrode 7 to halt.

Then the heater unit 31 is energized while the electromagnetic grip 32 is actuated to hold the wire 7. The machining head 4 is then moved upwards to give a tension to the heated wire 7. This causes the wire 7 to be thermally controlledly elongated and broken as described previously to develop a straight, sharply pointed broken, free end portion. With the continued upward displacement of the machining head 4, the broken, free end portion of wire electrode is withdrawn from the hole 11a and retracted above the workpiece 11 as shown in FIG. 8C. The lower broken half of wire 7 is fed out through the belt assembly 114 to 117 to the collection site.

In the subsequent step shown in FIG. 8D, the workpiece 11 is repositioned under drive signals furnished from the NC unit 24 so that the next operation-starting hole 11b comes in coincidence with the traveling axis of the wire electrode 7.

In the following step of FIG. 8E, the machining head 4 is again moved down to insert the broken, free end portion of wire 7 into the hole 11b and the electromagnetic grip 32 is deactuated to release the wire 7. The capstan and pinch-roller units 12 and 13 and the takeup belt assembly 114 to 117 are actuated to cause the inserted wire electrode 7 to be further driven and its lower end to pass through the hole 11b, the lower wire guide member 109 and the capstan and pinch rollers 12 and to be rolled into the takeup belt assembly 114 to 117. The wire-cutting operation starting at the base hole 11b follows.

Figure 9:
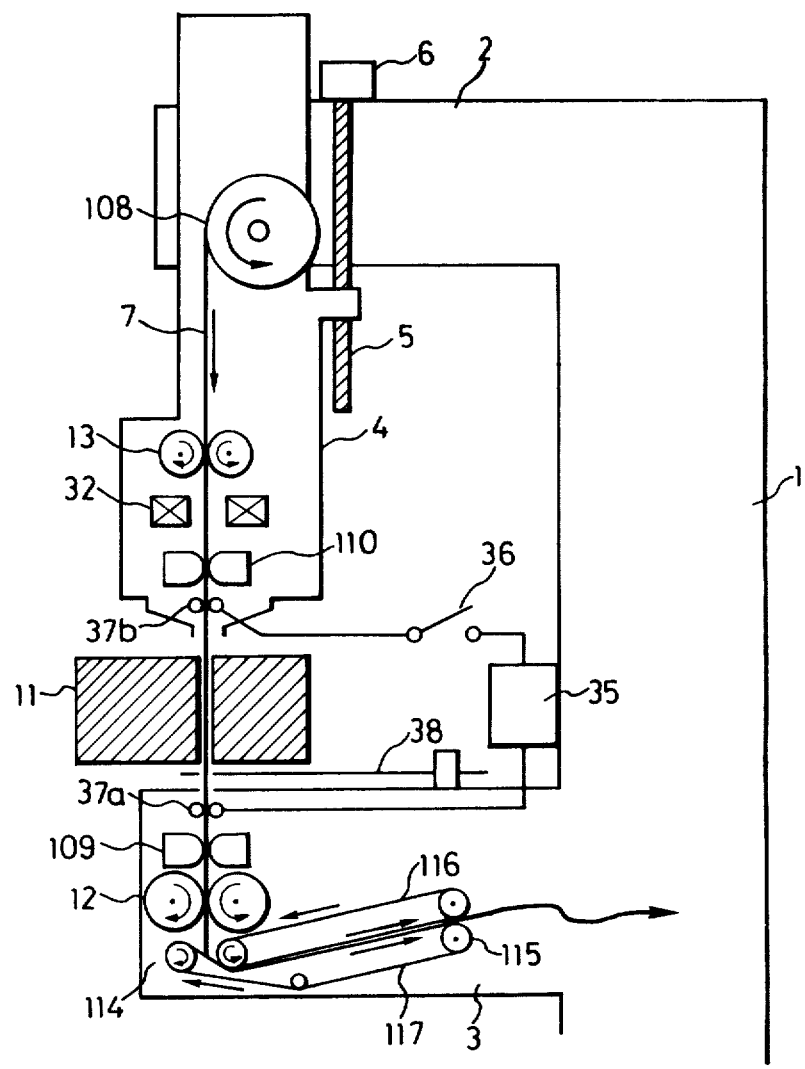
FIG. 9 is a schematic view diagrammatically illustrating a wire-cutting electroerosion machine or apparatus similar to that shown in FIG. 4 and including a further form of the wire-heating assembly.

FIG. 9 shows the wire-cutting electroerosion machine including a further embodiment of the invention in which the continuous wire electrode 7 after completing a given wire-cutting operation is straightened by thermal elongation and cutting in a zone between the machining wire-positioning guide members 109 and 110. In this embodiment, a heating current supply 35 is connected via an operating switch 36 to a pair of current conducting rollers 37a and 37b disposed in contact with the wire electrode 7 across the workpiece 11 between the upper and lower guide members 109 and 110. In the path of the wire electrode between the workpiece 11 and the lower current-conducting roller 37a there is disposed a cutter unit 38.

Closing the switch 36 causes a heating current from the supply 35 to be passed directly through the wire electrode 7 stretched between the guide members 109 and 110. The electromagnetic grip 32 is actuated to hold the wire 7 and the machining head 4 is moved upwards to give a tension to the heated wire 7. The wire stretch elongates and is broken by the cutter 38 into an upper half leading from the supply 108 and a lower half leading to the takeup belt assembly 114 to 117. Thereafter, step corresponding to the steps shown in FIGS. 8D and 8E follow in sequence.

What is claimed is:

1. In a method of wire-cutting a workpiece by electroerosion wherein a continuous wire electrode is axially transported from a supply means to a collection means along a predetermined wire guiding path to traverse the workpiece linearly between a pair of wire guide members disposed at opposite sides of the workpiece in the path and adapted to position the wire electrode therebetween in a machining relationship with the workpiece; and an electrical machining current is passed between the wire electrode and the workpiece across a machining gap flooded with a machining medium to electroerosively remove material from the workpiece while the workpiece is displaced transversely and relative to the wire electrode along a prescribed feed path to form a desired cut in the workpiece, the improvement which comprises the preliminary steps of:

(a) forming a straight through-hole in the workpiece at a preselected location thereof representing a start point of said prescribed feed path;
  (b) inserting through said through-hole a detached wire element constituting a slender guide element and being straight at least along the length of said through-hole;
  (c) securely holding said detached wire element on said workpiece while leaving it inserted in said through-hole against dropping out;
  (d) positioning a wire electrode having a broken, free end portion extending continuously from the supply means through a first of said wire guide members disposed at an inlet side of said workpiece to locate said broken, free end portion ahead of said workpiece;
  (e) positioning said workpiece to locate said broken, free end portion projecting from said first wire guide member, ahead of and coaxially with said through-hole;
  (f) connecting an end of said detached wire element projecting from said through-hole at said inlet side with said broken, free end portion of the wire electrode;
  (g) withdrawing said detached wire element from said through-hole through a second of said wire guide members disposed at an outlet side of said workpiece and continuingly displacing said element to advance said wire electrode through said second wire guide member onto said collection means; and subsequently
  (h) proceeding to the wire-cutting of said workpiece by electroerosion.

2. The improvement defined in claim 3 wherein in step (a) a plurality of such through-holes as mentioned are formed in the workpiece at such preselected locations as mentioned in order to produce a corresponding number of desired cuts therein by electroerosion and wherein step (b) comprises inserting respective ones of a plurality of such detached wire elements as mentioned through the respective ones of said through-holes, step (c) comprises securely holding said detached wire elements on said workpiece while leaving them inserted in their respective through-holes against dropping out and the combination of steps (d) through (h) is carried out repetitively for successive machining operation starting at said through-holes in turn.

3. In a method of wire-cutting a workpiece by electroerosion wherein a continuous wire electrode is axially transported from a supply means to a collection means along a predetermined wire guiding path to traverse the workpiece linearly between a pair of wire guide members disposed at opposite sides of the workpiece in the path and adapted to position the wire electrode therebetween in a machining relationship with the workpiece; and an electrical machining current is passed between the wire electrode and the workpiece across a machining gap flooded with a machining medium to electroerosively remove material from the workpiece while the workpiece is disposed transversely and relative to the wire electrode along a prescribed feed path to form a desired cut in the workpiece, the improvement which comprises the preliminary steps of:

(a) determining a preselected start point of said prescribed feed path at a location on said workpiece;
  (b) positioning said workpiece to locate said location to fall in a straight line path defined between said wire guide members;
  (c) positioning a said wire electrode having a broken, free end portion extending continuously from said supply means through a first of said wire guide members disposed at an inlet side of said workpiece to locate said broken, free end portion to lie between said first wire guide member and said location on said positioned workpiece;
  (d) forming a straight starting through-hole in said workpiece by introducing a straight slender tool electrode constituting a slender guide element to juxtapose it with said positioned workpiece at an outlet side thereof opposite to said inlet side and coaxially with said straight line path and electroerosively machining said through-hole in said workpiece with said slender tool electrode while advancing said slender tool electrode along said straight line path from said outlet side to advance a free end of said slender tool electrode into, through and out of said workpiece into said inlet side;
  (e) connecting said free end of said slender tool electrode projecting from said formed through-hole at said inlet side with said broken, free end portion of the wire electrode;

(f) withdrawing said slender tool electrode connected to said wire electrode from said through-hole and through said outlet side and continuingly displacing said slender tool electrode to advance said wire electrode through said second machining guide member onto said collection means; and subsequently (g) proceeding to the wire-cutting of said workpiece by electroerosion.

4. The improvement defined in claim 3, further comprising the step of imparting a sonic or ultrasonic vibration to said slender tool electrode during the electroerosive machining of said through-hole in said workpiece in step (d).

5. The improvement defined in claim 3 wherein said slender tool element is a wire electrode having a broken, free end portion and extending continuously to said collection means and constituting the counterpart of the first-mentioned wire electrode having said broken, free end portion to form said continuous wire electrode.

6. The improvement defined in claim 1 or claim 3 wherein said end of the slender guide element projecting from said through-hole is connected with said free end portion of the wire electrode at said inlet side by fusion-joining them together.

7. In a method of wire-cutting a workpiece by electroerosion wherein a continuous wire electrode is axially transported from a supply means to a collection means along a predetermined wire guiding path to traverse the workpiece linearly between a pair of wire guide members disposed at opposite sides of the workpiece in the path and adapted to position the wire electrode therebetween in a machining relationship with the workpiece; and an electrical machining current is passed between the wire electrode and the workpiece across a machining gap flooded with a machining medium to electroerosively remove material from the workpiece while the workpiece is displaced transversely and relative to the wire electrode along a prescribed feed path to form a desired cut in the workpiece, the improvement which comprises the preliminary steps of:

(a) forming a straight through-hole in a workpiece at a preselected location thereof representing a start point of said prescribed feed path;

(b) providing a wire electrode having a straightened broken, free end portion and extending continuously from the supply means through a first of said guide members by:

(b1) holding a continuous electrode wire extending continuously between said supply means and said collection means through a previously machined cut, (b2) heating said continuous electrode wire at least along a part thereof located in one of said opposite sides between said previous cut and the corresponding wire guide member to a temperature sufficient to thermally soften at least said part while drawing said electrode wire at least in said one side under a tension sufficient to elongate and slenderize said softened part, (b3) applying a stress onto said elongated part sufficient to break there said electrode wire to produce a first broken half constituting said wire electrode and having said straightened broken, free end portion and a second broken half extending continuously to said collection means through a second of said wire guide members, and (b4) displacing said second broken half through said second wire guide member to collect into said collection means;

(c) displacing said previous cut and positioning said wire electrode to locate said straightened broken, free end portion thereof, ahead of said workpiece;

(d) positioning said workpiece to locate said through-hole therein coaxially with and ahead of said straightened broken, free end portion of, said wire electrode;

(e) advancing said wire electrode to displace said straightened broken, free end portion into, through and out of said through-hole and through said second guide member; and subsequently (f) proceeding to the wire-cutting of said workpiece by electroerosion.

8. The improvement defined in claim 7 wherein said heating is applied to said electrode wire so as to create a predetermined temperature gradient at least in the region of said one side.

9. In combination with an apparatus for wire-cutting a workpiece by electroerosion having a continuous wire electrode axially transported from a supply means to a collection means along a predetermined wire guiding path; a pair of wire guide members disposed at opposite sides of the workpiece in the path for bridging the axially traveling wire electrode linearly thereacross through the workpiece and positioning it in a machining relationship with the workpiece; power supply means for passing an electrical machining current between the wire electrode and the workpiece across a machining gap flooded with a machining medium to electroerosively remove material from the workpiece; and cutting feed means for displacing the workpiece transversely and relative to the axially traveling wire electrode along a prescribed feed path to form a desired electroerosion cut in the workpiece, (a) means for forming a straight through-hole in the workpiece at a preselected location thereof representing a start point of said preselected feed path;

(b) a detached wire element constituting a slender guide element being straight at least along the length of said through-hole and adapted to be inserted into said through-hole for anchoring therein against dropping out;

(c) means for positioning a wire electrode having a broken, free end portion extending continuously from the supply means through a first of said wire guide members disposed at an inlet side of said workpiece to locate said broken, free end portion ahead of said workpiece;

(d) means for positioning said workpiece to locate said broken, free end portion from said first wire guide member, ahead of and coaxially with said through-hole;

(e) means for connecting an end of said detached wire element projecting from said through-hole at said inlet side with said broken, free end portion of the wire electrode; and (f) means for withdrawing said detached wire element from said through-hole through a second of said wire guide members disposed at an outlet side of said workpiece and continuingly displacing said wire element to advance said wire electrode through said second guide member onto said collection means.

10. In combination with an apparatus for wire-cutting a workpiece by electroerosion having a continuous wire electrode axially transported from a supply means to a collection means along a predetermined wire guiding path; a pair of wire guide members disposed at opposite sides of the workpiece in the path for bridging the axially traveling wire electrode linearly thereacross through the workpiece and positioning it in a machining relationship with the workpiece; power supply means for passing an electrical machining current between the wire electrode and the workpiece across a machining gap flooded with a machining medium to electroerosively remove material from the workpiece; and cutting feed means for displacing the workpiece transversely and relative to the axially traveling wire electrode along a prescribed feed path to form a desired electroerosion cut in the workpiece,
  (a) means for positioning said workpiece to locate a preselected position representing a start point of said prescribed feed path, to fall in a straight line path defined between said wire guide members;
  (b) means for positioning a said wire electrode having a broken, free end portion extending continuously from said supply means through a first of said wire guide members disposed at an inlet side of said workpiece to locate said broken, free end portion to lie between said first wire guide member and said positioned workpiece;
  (c) a straight slender tool electrode constituting a slender guide element;
  (d) means for positioning said slender tool electrode to juxtapose it with said positioned workpiece at an outlet side thereof opposite to said inlet side and coaxially with said straight line path;
  (e) a power supply for passing an electroerosion machining current between said slender tool electrode and said workpiece to remove material from the workpiece;
  (f) a feed unit for advancing said slender tool electrode along said straight line path from said outlet side to advance a free end of said slender tool electrode into, through and out of said workpiece into said inlet side, thereby electroerosively machining said through-hole in said workpiece;
  (g) means for connecting said free end of said slender tool electrode projecting from said formed through-hole at said inlet side with said broken, free end portion of the wire electrode; and
  (h) means for withdrawing said slender tool electrode connected to said wire electrode from said through-hole and through said outlet side, thereby leading said wire electrode from said inlet side into said outlet side.

11. The combination defined in claim 10, further comprising means for imparting a sonic or ultrasonic vibration to said slender tool electrode being advanced along said straight line path by said means (f).

12. The combination defined in claim 10 wherein said means for connecting comprises a fusion welding means.

13. In combination with an apparatus for wire-cutting a workpiece by electroerosion having a continuous wire electrode axially transported from a supply means to a collection means along a predetermined wire guiding path; a pair of wire guide members disposed at opposite sides of the workpiece in the path for bridging the axially traveling wire electrode linearly thereacross through the workpiece and positioning it in a machining relationship with the workpiece; power supply means for passing an electrical machining current between the wire electrode and the workpiece across a machining gap flooded with a machining medium to electroerosively remove material from the workpiece; and cutting feed means for displacing the workpiece transversely and relative to the axially traveling wire electrode along a prescribed feed path to form a desired electroerosion cut in the workpiece,
  (a) means for forming a straight through-hole in a workpiece at a preselected location thereof representing a start point of said prescribed feed path;
  (b) means for providing a said wire electrode with a straightened broken, free end portion and extending continuously from the supply means through a first of said wire guide members, said means (b) comprising:
  (b1) means for holding a continuous electrode wire extending continuously between said supply means and said collection means through a previously machined cut;
  (b2) a heater means for heating said continuous electrode wire at least along a part thereof located in one of said opposite sides between said previous cut and the corresponding wire guide member to a temperature sufficient to thermally soften at least said part,
  (b3) means operable in conjunction with means (b2) for drawing said electrode wire being heated, at least in said one side under a tension sufficient to elongate and slenderize said softened part,
  (b4) means for applying a stress onto said elongated part sufficient to break there said electrode wire to produce a first broken half constituting said wire electrode and having said straightened broken, free end portion and a second broken half extending continuously to said collection means through a second of said wire guide members, and
  (b5) means for displacing said second broken half through said second wire guide member to collect into said collection
  (c) means for positioning said wire electrode so as to locate said straightened broken, free end portion thereof ahead of said workpiece,
  (d) means for positioning said workpiece to locate said through-hole therein coaxially with and ahead of said straightened broken, free end portion of, said wire electrode; and
  (e) means for advancing said wire electrode to displace said straightened broken, free end portion into, through and out of said through-hole and through said second guide member.

14. The combination defined in claim 13 wherein said heater means has a heating surface tapered so as to create a predetermined temperature gradient at least in the region of said one side, convergently in the direction of advance of said wire electrode effected by means. (e).

15. In a method of wire-cutting a workpiece by electroerosion wherein a continuous wire electrode is axially transported from a supply means to a collection means along a predetermined wire guiding path to traverse the workpiece linearly between a pair of wire guide members disposed at opposite sides of the workpiece in the path and adapted to position the wire electrode therebetween in a machining relationship with the workpiece; and an electrical machining current is passed between the wire electrode and the workpiece across a machining gap flooded with a machining medium to electroerosively remove material from the workpiece while the workpiece is displaced transversely and relative to the wire electrode along a prescribed feed path to form a desired cut in the workpiece, the improvement which comprises the preliminary steps of:
  (a) determining a preselected start point of said prescribed feed path at a location on said workpiece;
  (b) positioning said workpiece to locate to fall in a straight line path defined between said wire guide members;
  (c) positioning a said wire electrode having a broken, free end portion extending continuously from said supply means through a first of said wire guide members disposed at an inlet side of said workpiece to locate said broken, free end portion projecting from said first guide member to lie coaxially with said straight line path ahead of said location on said workpiece;
  (d) electroerosively machining said workpiece with said broken, free end portion while advancing said wire electrode along said straight line path to advance said broken, free end portion into through and out of said workpiece and thence through a second of said wire guide members disposed at an outlet side of the workpiece for collection onto said collection means, thereby forming a straight starting through-hole at said location on said workpiece and simultaneously threading said wire electrode through said workpiece; and subsequently
  (e) proceeding to the wire-cutting of said workpiece by electroerosion.

16. In a method of wire-cutting a workpiece by electroerosion wherein a continuous wire electrode is axially transported from a supply means to a collection means along a predetermined wire guiding path to traverse the workpiece linearly between a pair of wire guide members disposed at opposite sides of the workpiece in the path and adapted to position the wire electrode therebetween in a machining relationship with the workpiece; and an electrical machining current is passed between the wire electrode and the workpiece across a machining gap flooded with a machining medium to electroerosively remove material from the workpiece while the workpiece is displaced transversely and relative to the wire electrode along a prescribed feed path to form a desired cut in the workpiece, the improvement which comprises the preliminary steps of:
  (a) forming a straight through-hole in a workpiece at a preselected location thereof representing a start point of said prescribed feed path;
  (b) providing a wire electrode having a straightened broken, free end portion and extending continuously from one of said supply and collection means through a first of said wire guide members by:
  (b1) holding a continuous electrode wire extending continuously between said supply means and said collection means through a previously machined cut,
  (b2) heating said continuous electrode wire at least along a part thereof located in one of said opposite sides between said previous cut and the corresponding wire guide member to a temperature sufficient to thermally soften at least said part while drawing said electrode wire at least in said one side under a tension sufficient to elongate and slenderize said softened part, and
  (b3) applying a stress onto said elongate part sufficient to break there said electrode wire to produce a first broken half having said straightened broken, free end portion and a second broken half extending continuously to the other of said supply and collection means through a second of said wire guide members, and
  (c) withdrawing one of said first and second broken halves which extends through said previous cut into said one side, from said previous cut whereby the broken end portions of said halves are located ahead of said previous cut in said opposite sides, respectively;
  (d) displacing said previous cut and positioning said workpiece to locate said straight through-hole therein coaxially with and ahead of said straightened broken, free end portion of, said first broken half;
  (e) displacing said first broken half along said straight line path to pass said straightened broken free end portion into, through and out of said through-hole until it comes into engagement with the broken, free end portion of said second broken half;
  (f) connecting together the free end portions of said first and second broken halves brought into engagement;
  (g) advancing the thus-formed continuous wire electrode from said supply means to said collection means; and subsequently
  (h) proceeding to the wire-cutting of said workpiece by electroerosion.

17. The improvement defined in claim 16 wherein said heating is applied to said electrode wire so as to create a predetermined temperature gradient at least in the region of said one side.

* * * * *